United States Patent [19]

Hasuo et al.

[11] Patent Number: 5,367,704
[45] Date of Patent: Nov. 22, 1994

[54] METHOD AND SYSTEM FOR LIMITING PROGRAM UTILIZATION PERIOD IN COMPUTER

[75] Inventors: Keisuke Hasuo; Takeshi Sakuma, both of Oome, Japan

[73] Assignee: Kabushiki Kaisha Toshiba, Kawasaki, Japan

[21] Appl. No.: 13,193

[22] Filed: Jan. 29, 1993

Related U.S. Application Data

[63] Continuation of Ser. No. 510,219, Apr. 18, 1990, abandoned.

[30] Foreign Application Priority Data

Apr. 18, 1989 [JP] Japan ................................ 1-98313

[51] Int. Cl.⁵ ............................................. G06F 9/00
[52] U.S. Cl. .................................... 395/800; 395/725; 364/286; 364/DIG. 1
[58] Field of Search .................... 395/375, 725, 800

[56] References Cited

U.S. PATENT DOCUMENTS

| | | | |
|---|---|---|---|
| 4,278,837 | 7/1981 | Best | 364/200 |
| 4,484,217 | 11/1984 | Block et al. | 358/84 |
| 4,553,252 | 11/1985 | Egendorf | 377/15 |
| 4,593,376 | 6/1986 | Volk | 364/401 |
| 4,658,093 | 4/1987 | Hellman | 380/25 |
| 5,103,392 | 4/1992 | Mori | 395/725 |

OTHER PUBLICATIONS

*Journal of the Patent Office Society*, vol. 65, Oct. 1983 "Computer Assisted Prior Art Searching", by Beeker, et al, pp. 536–585.

*Primary Examiner*—Alyssa H. Bowler
*Assistant Examiner*—John Harrity
*Attorney, Agent, or Firm*—Cushman, Darby & Cushman

[57] ABSTRACT

In a data processing system, a program list representing the names of programs which can be used and limit values representing a permissible time period of use of the programs are stored. When the system is started or a program is requested, the present time is acquired to determine permissibility of use of the program. Only when the present time is within the permissible time period of use is the requested program allowed to start.

6 Claims, 3 Drawing Sheets

| UTILIZATION PROGRAM NAME | UTILIZATION LIMIT |
|---|---|
| A, B, C, | MONTH DAY YEAR<br>MM DD YY |

METHOD AND SYSTEM FOR LIMITING PROGRAM UTILIZATION PERIOD IN COMPUTER

This is a continuation of application Ser. No. 07/510,219, filed on Apr. 18, 1990, now abandoned.

BACKGROUND OF THE INVNETION

1. Field of the Invention

The present invention relates to a method and system for limiting a program utilization period in a computer.

2. Description of the Related Art

Many problems of unauthorized usage and unauthorized copies of application programs have arisen recently in the field of computers. For protection of programs, therefore, a method has been adopted which restricts the kinds of computers that can use the programs by use of information specific to hardware of computer systems.

However, such a method takes no account of a factor with respect to a period of time. Thus, a program once stored in a computer system can be used semipermanently. For example, for programs for demonstration, usage of such program is not limited for a given period of time, nor is the user prevented from using the programs after the elapse of the given period of time. Accordingly, practically sufficient protection of programs cannot be accomplished.

In view of the above, a data processing apparatus is desired which can implement practically sufficient protection of programs by restricting the use of programs by a period of time.

SUMMARY OF THE INVENTION

It is an object of the present invention to provide a method and system for limiting a program utilization period in a computer.

According to one aspect of the present invention, there is provided a method for limiting a program utilization period in a computer, the method comprising the steps of:

storing at least one program and a program list, the program list including at least one limit value corresponding to the stored program, and the limit value representing a program utilization limit;

requesting a start of a desired program;

acquiring the limit value corresponding to the requested desired program from the stored program list;

detecting a time value when the desired program is requested;

comparing the detected time value with the acquired limit value; and controlling the start of the requested desired program in accordance with a comparison result.

According to another aspect of the present invention, there is provided a system for limiting a program utilization period in a computer, the system comprising:

storing means for storing at least one program and a program list, the program list including at least one limit value corresponding to the stored program, and the limit value representing a program utilization limit;

means for requesting a start of a desired program;

means for acquiring the limit value corresponding to the requested desired program from the stored program list;

means for detecting a time value when the desired program is requested;

means for comparing the detected time value with the acquired limit value; and controlling means for controlling the start of the requested desired program in accordance with a comparison result.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figures 1, 2:
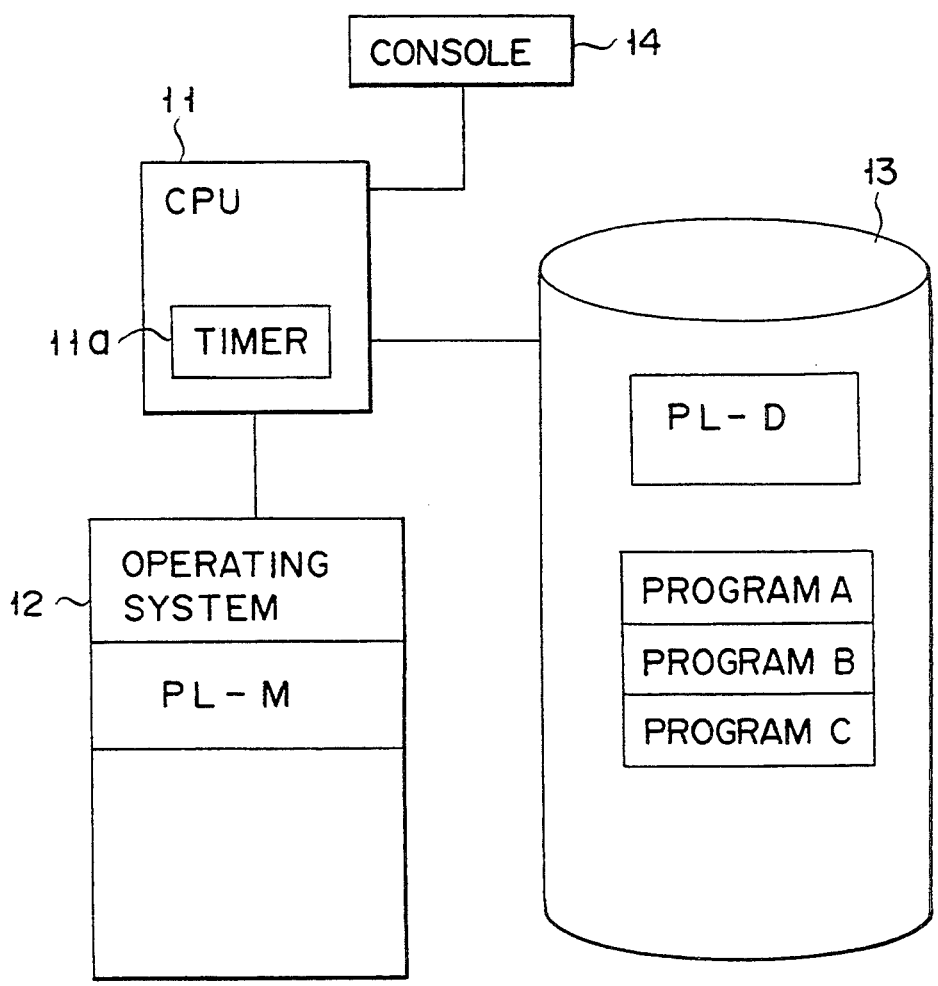
FIG. 1 is a block diagram of a data processing system embodying the present invention.
FIG. 2 is a diagram illustrating the contents of a program list.

As shown in FIG. 1, a data processing system embodying the present invention comprises a CPU (central processing unit) 11, a main memory 12, a disk memory 13 and a console 14. CPU 11 has a timer 11a and is connected to main memory 12, disk memory 13 and console 14 to carry out data processing. Timer 11a obtains a time value such as a date.

Main memory 12 stores data to be processed and a program used for controlling data process by CPU 11. An operating system is stored in main memory 12 and has a determination function program for permitting or inhibiting the start of a program when a request is made to start the program.

Disk memory 13 stores programs A, B and C and a program list PL-D. Program list PL-D includes list data representing the name of a program which is permitted to use and a limit value representing the limitation of use of a program. In FIG. 2, programs A, B and C are permissible to use. The limit value of use of each program is set to the same date "YYMMDD". "YY" represents the 2 low-order digits of a year in the Christian era, "MM" represents a month and "DD" represents a day.

Console 14 is used for requesting the start of a program.

Program list PL-D is stored in main memory 12 as a program list PL-M at the time of the requesting of the start of the program. Program list PL-M is referred to by CPU 11. A determination of permission/inhibition of the start of the program is performed by CPU 11 on the basis of the limit value and the list data of program list PL-M. The determination of the limitation of use is performed by comparing the limit value with the present time value in timer 11a.

Next, the operation of the present system for permitting/inhibiting the use of a program will be described with reference to FIGS. 3 and 4.

Figure 3:
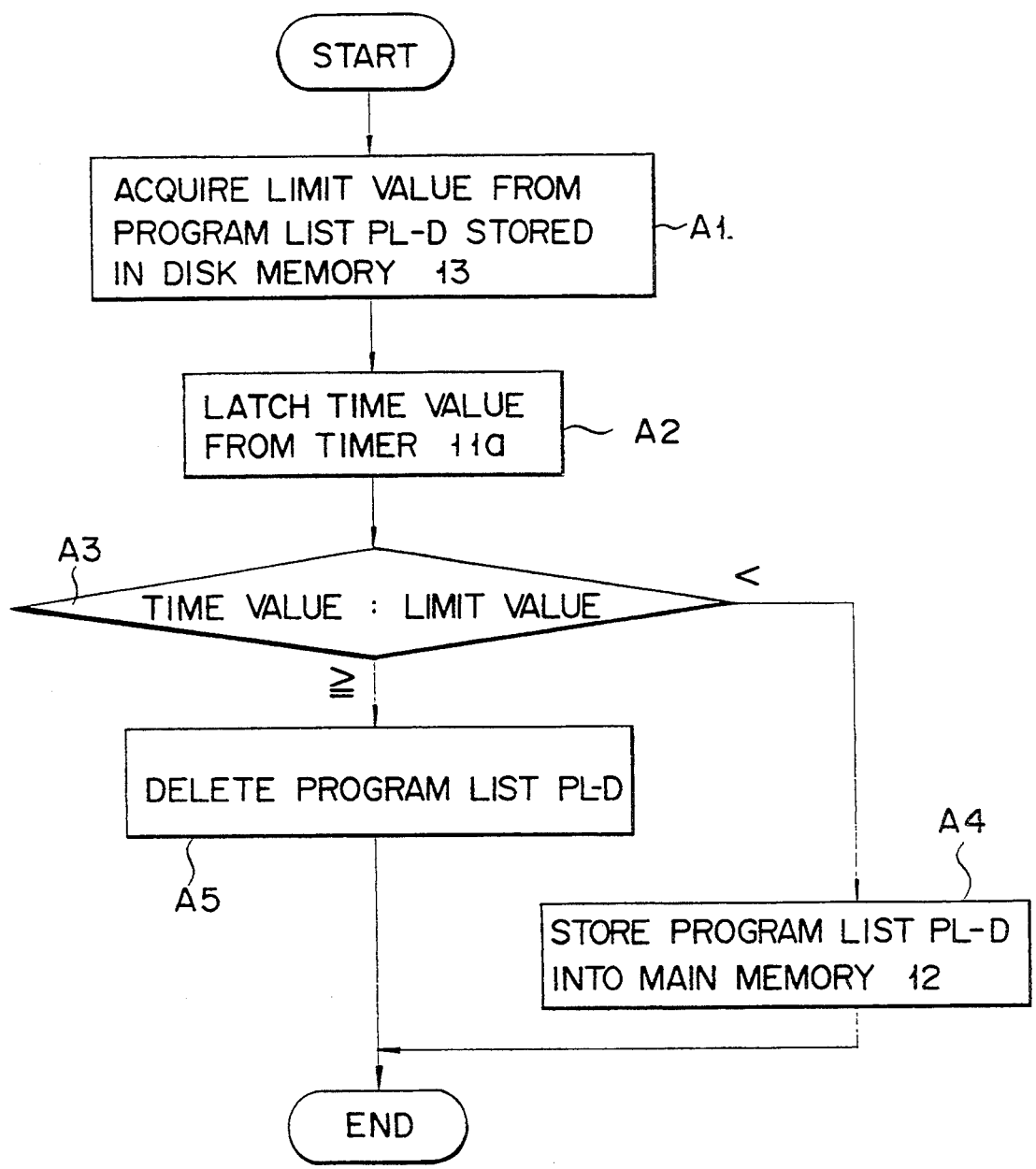
FIG. 3 is a flowchart for determining a program utilization period at the time of starting of the system.

In FIG. 3, when the present system is started, program list PL-D is read from disk memory 13 in step A1. The limit value common to the respective programs is acquired from program list PL-D.

In step A2, the present time value of timer 11a is latched.

In step A3, the present time value is compared with the limit value. That is, it is determined that whether or not the present time is within the limitation of use.

when, in step A3, the present time value is less than the limit value, i.e., when the present time is within the limitation of use, program list PL-D is stored in main memory 12 as list PL-M (step A4).

When, in step A3, the limitation of use is past, program list PL-D representing the names of programs which can be used is deleted (step A5). It thus becomes impossible to start all the programs in program list PL-D.

Figure 4:
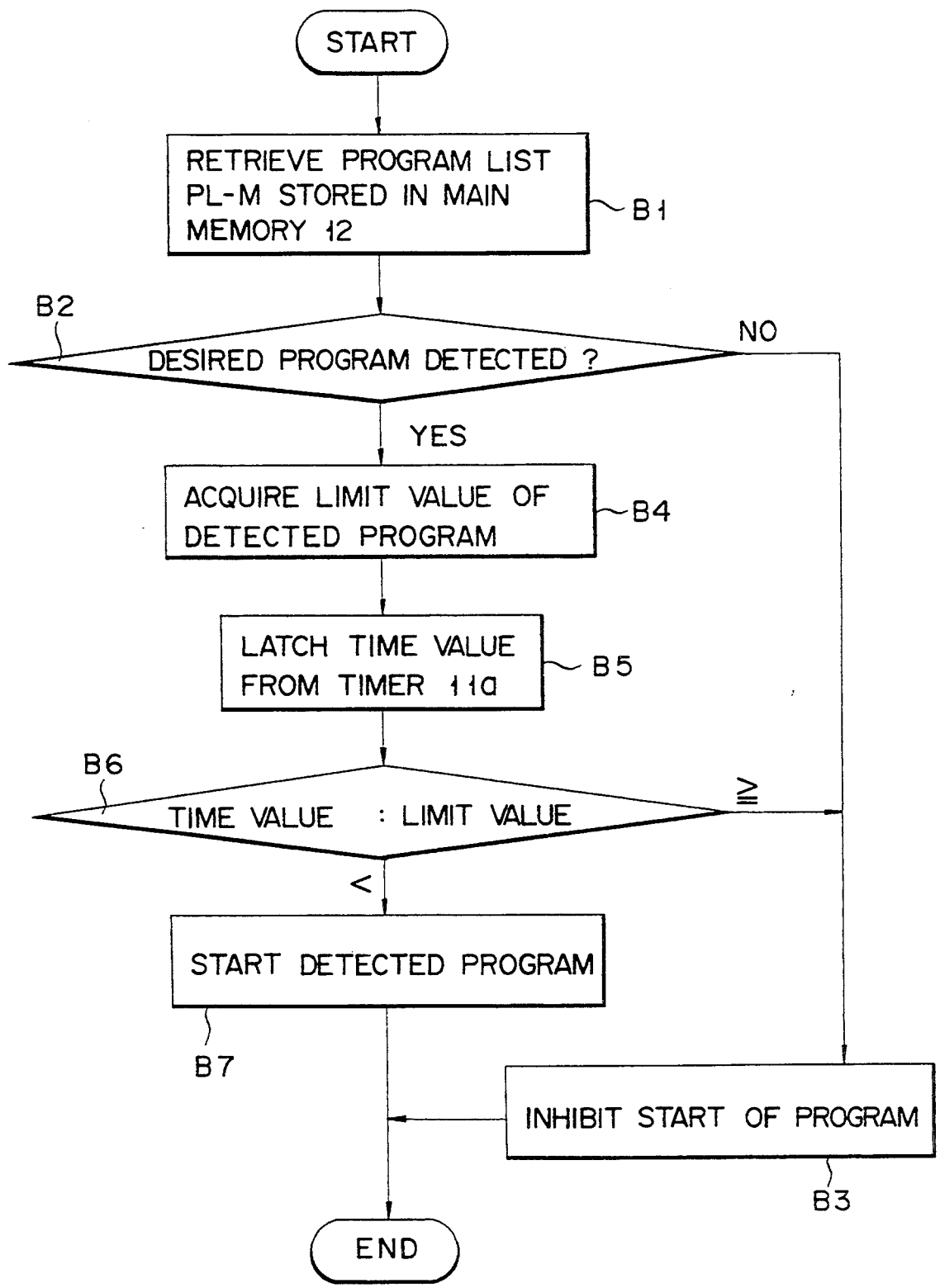
FIG. 4 is a flowchart for determining the program utilization period at the time of starting of the program.

In FIG. 4, when the start of a program is requested, the requested program is retrieved in program list PL-M stored in main memory 12 in step B1.

In step B2, according to the result of the retrieval of the program, it is determined that whether or not the requested program is a program which is permitted to use. That is, when the requested program is detected in program list PL-M, it is determined that the detected program is permitted to use.

In step B2, on the other hand, when the requested program is not detected, the start of the program is inhibited (step B3).

In step B2, when the requested program is detected, the limit value corresponding to the detected program is acquired (step B4). The present time value of timer 11a is latched (step B5).

In step B6, the present time value is compared with the limit value of the program so as to determine whether or not the present time is within the limitation of use of the program.

When, in step B6, the present time is within the limitation of use, the requested program is allowed to start (step B7).

When, in step B6, the limitation of use is past, the start of the program is inhibited (step B3).

As described above, programs which are permitted to use are set by a program list, and the limitation of use of the programs is specified by a limit value. Therefore, when the limitation of use are past, the start of programs can be inhibited. By applying time parameters to program protection, the semipermanent use of programs can be avoided after the programs have been stored in a computer. For example, such usage of programs as allows a user to use them for demonstration only for a predetermined period of time can be implemented.

In the present embodiment, the limitation of use of programs is checked at the time of starting of the system and at the time of starting of a program. However, the checking of the limitation of use at the system starting time or at the program starting time will provide the same advantage as the present embodiment. In addition, it is possible to set a limit value representing the limitation of its use to program list PL-D itself or set a limit value for each program. For example, the limit value of the list PL-D may be checked when the system is started, and the limit value of a program may be checked when the program is requested.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for limiting a date range during which a program can be used on a computer comprising the steps of storing in the computer at least a plurality of programs and a program list, the program list including a limit value including a year, month and date beyond which each program can no longer be used;

reading the program list into a current memory area;

obtaining a present value indicative of year, month and date;

comparing said present value with each limit value for each program, and determining whether the present value is earlier in time than the limit value;

determining if each program can be executed based on said comparing step, and preparing a PL-M program list listing all the programs where the present value is earlier in time than the limit value, and not any programs whose present value is later than the limit value;

determining a request to start one particular program among the programs stored in the computer;

determining if said one particular program is listed on the PL-M program list, and starting said program if so, and inhibiting the start of said one particular program if it is not listed on said PL-M program list.

2. A method for limiting a date range during which a program can be used on a computer comprising the steps of storing in the computer at least a plurality of programs and a program list, the program list including a limit value including a date beyond which an associated program can no longer be used;

determining a request to start one particular program among the programs stored in the computer;

obtaining a present value indicative of date, at a time that said request is determined;

comparing said present value with a limit value for said one particular program, and determining whether the present value is earlier in time than the limit value;

determining if said one particular program can be executed based on said comparing step, and preparing a PL-M program list listing said one particular program whenever a present value is earlier than the limit value, and not listing any programs whose present value is later than the limit value;

determining if said one particular program is listed on the PL-M program list, and starting said program if so, and inhibiting the start of said one particular program if it is not listed on said PL-M program list.

3. A method as in claim 2 wherein said date includes year, month and day of a month.

4. A computer-based apparatus having structural elements for limiting a date range during which a program can be used on a computer comprising:

a storage element which stores at least a plurality of programs and a program list, the program list including a limit value including a year, month and date beyond which each program can no longer be used;

means for reading the program list into a current memory area;

a timer obtaining a present value indicative of year, month and date;

means for comparing said present value with each limit value for each program on the program list, and determining whether the present value is earlier than the limit value;

means for preparing a PL-M program list listing all the programs where the present value is earlier in time than the limit value, and not listing any programs whose present value is later than the limit value;

means for determining a request to start one particular program from the programs stored in the computer;

means for determining if said one particular program is listed on the PL-M program list, and starting said program if so, and inhibiting the start of said one particular program if it is not listed on said PL-M program list.

5. A computer-based apparatus having structural elements for limiting a date range during which a program can be used on a computer comprising:

a storage element which stores at least a plurality of programs and a program list, the program list including a limit value including a date beyond which an associated program can no longer be used;

means for determining a request to start one particular program from the programs stored in the computer;

a timer obtaining a present value indicative of date at a time that said request is determined;

means for comparing said present value with a limit value for said one particular program, and determining whether the present value is earlier than the limit value;

means for preparing a PL-M program list listing said one particular program, whenever a present value is earlier than the limit value, and not listing any programs whose present value is later than the limit value;

means for determining if said one particular program is listed on the PL-M program list, and starting said program if so, and inhibiting the start of said one particular program if it is not listed on said PL-M program list.

6. An apparatus as in claim 5, wherein said date includes year, month and day of a month.

* * * * *